US012638188B2

(12) United States Patent
Son

(10) Patent No.: US 12,638,188 B2
(45) Date of Patent: May 26, 2026

(54) ELECTRIC RANGE OF WHICH HEAT POWER IS CONTROLLED WITHOUT USER INTERVENTION, AND CONTROL METHOD THEREFOR

(71) Applicant: LG ELECTRONICS INC., Seoul (KR)

(72) Inventor: Howon Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1043 days.

(21) Appl. No.: 17/778,090

(22) PCT Filed: Sep. 9, 2020

(86) PCT No.: PCT/KR2020/012199

§ 371 (c)(1),
(2) Date: May 19, 2022

(87) PCT Pub. No.: WO2021/101044

PCT Pub. Date: May 27, 2021

(65) Prior Publication Data

US 2022/0412567 A1 Dec. 29, 2022

(30) Foreign Application Priority Data

Nov. 22, 2019 (KR) ........................ 10-2019-0151581

(51) Int. Cl.
*F24C 7/08* (2006.01)
*F24C 15/10* (2006.01)
*G06F 3/01* (2006.01)
(52) U.S. Cl.
CPC .............. *F24C 7/083* (2013.01); *F24C 7/086* (2013.01); *F24C 15/105* (2013.01); *G06F 3/017* (2013.01)

(58) Field of Classification Search
CPC ........ F24C 15/105; F24C 7/083; F24C 7/086; F24C 7/087; G06F 3/017; Y02B 40/00;
(Continued)

(56) References Cited

U.S. PATENT DOCUMENTS 5,488,214 A * 1/1996 Fettig ................... H05B 6/1263
219/127
6,236,025 B1 5/2001 Berkcan et al.
6,288,374 B1 9/2001 Eskildsen et al.
9,980,321 B2 5/2018 Sorenson et al.
(Continued)

FOREIGN PATENT DOCUMENTS

AU 2018278694 10/2019
CN 209147170 7/2019
(Continued)

OTHER PUBLICATIONS

Korean Office Action issued in Application No. 10-2019-0151581 dated Jan. 15, 2024.
(Continued)

*Primary Examiner* — Sang Y Paik
(74) *Attorney, Agent, or Firm* — KED & ASSOCIATES

(57) ABSTRACT
Disclosed are an electric range of which heat power is controlled without user intervention, and a control method therefor. The electric range controls heat power by using a gesture in which a user lifts an object to be heated. The electric range comprises a case; a cover plate which is coupled to the upper end of the case and which has an upper surface on which the object to be heated can be arranged; a heating part, which is disposed inside the case, for heating the object to be heated; and a control part for controlling the heating part. The control part controls the heating part so as to reduce the heating power generated by the heating part when the object to be heated, which is heated by the heating part, is lifted from the upper surface of the cover plate.

20 Claims, 8 Drawing Sheets

(58) Field of Classification Search
CPC ............. H05B 6/00; H05B 6/02; H05B 6/04; H05B 6/06; H05B 6/062; H05B 6/12; H05B 6/1209; H05B 3/68; H05B 3/681; H05B 3/74
USPC ..................................................... 219/443.1
See application file for complete search history.

(56) References Cited

U.S. PATENT DOCUMENTS

| | | | | |
|---|---|---|---|---|
| 2002/0117497 | A1* | 8/2002 | Bassill | .................... H05B 6/062 |
| | | | | 219/626 |
| 2015/0312964 | A1 | 10/2015 | Sorenson et al. | |
| 2016/0029439 | A1* | 1/2016 | Kurose | .................. H05B 6/065 |
| | | | | 219/626 |
| 2017/0135159 | A1 | 5/2017 | Sorenson et al. | |
| 2017/0181228 | A1 | 6/2017 | Gutierrez et al. | |
| 2017/0245327 | A1 | 8/2017 | Viroli et al. | |
| 2017/0280514 | A1* | 9/2017 | Kim | ..................... H05B 6/1218 |
| 2018/0310361 | A1 | 10/2018 | Sorenson et al. | |
| 2021/0164662 | A1 | 6/2021 | Hedenblad et al. | |

FOREIGN PATENT DOCUMENTS

| | | |
|---|---|---|
| CN | 110454823 | 11/2019 |
| DE | 4007680 | 9/1991 |
| EP | 2 693 837 | 2/2014 |
| EP | 3001772 | 3/2016 |
| EP | 3116358 | 7/2019 |
| JP | 2005-011618 | 1/2005 |
| KR | 10-2012-0053581 | 5/2012 |
| KR | 10-2013-0059585 | 6/2013 |
| KR | 10-1433657 | 8/2014 |
| KR | 10-1614089 | 4/2016 |
| KR | 10-2019-0003155 | 1/2019 |

OTHER PUBLICATIONS

International Search Report dated Dec. 8, 2020 issued in Application No. PCT/KR2020/012199.
European Search Report issued in Application No. 20891066.1 dated Oct. 20, 2023.

* cited by examiner

<u>1</u>

ELECTRIC RANGE OF WHICH HEAT POWER IS CONTROLLED WITHOUT USER INTERVENTION, AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2020/012199, filed Sep. 9, 2020, which claims priority to Korean Patent Application No. 10-2019-0151581, filed Nov. 22, 2019, whose entire disclosures are hereby incorporated by reference.

TECHNICAL FIELD

The present disclosure relates to an electric range with adjusted heat without user intervention and a control method therefor.

BACKGROUND ART

Various types of cooking utensils are used to heat food at home or in a restaurant. The cooking utensils or appliances may include a gas range using gas and an electric range using electricity.

An electric range may be largely classified into a resistance heating type and an induction heating type. An electrical resistance type may generate heat by applying a current to a non-metallic heating element such as a metal resistance wire and silicon carbide, and may heat an object (e.g., a cooking vessel or container such as a pot or a frying fan) by radiating or conducting the generated heat. An induction heating type may apply high-frequency power to a coil and generate a magnetic field around the coil, and may heat a heating target made of a metal material by using an eddy current generated in the magnetic field.

A gas range may control a heat power by manipulation of a knob, and an electric range may control heat power by a touch manipulation. However, compared to the knob manipulation, the touch manipulation has a disadvantage in that it is not possible to quickly adjust the heat power As one example, if the contents in the cooking vessel or container boil over or become extremely heated, a user using the gas stove or gas range can quickly power the heat by rotating the knob or handle. However, a user using the electric range has to repeatedly perform a touch manipulation for adjusting the heat power, so it is impossible to quickly lower the heat.

DETAILED DESCRIPTION OF THE INVENTION

Technical Problem

An object of the present disclosure is to provide an electric range that may quickly adjust a heat power and a control method therefor.

A further object of the present disclosure is to provide an electric range that may adjust a heat power by using a user's gesture who holds a cooking container, and a control method therefor.

A still further object of the present disclosure is to provide an electric range that may allow a user to quickly resolve an emergency without any additional manipulation even in the event of an emergency in the process of heating and cooking, and a control method therefor.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

An electric range according to the present disclosure may have a technical feature in that the user can control the heat power by using a gesture of lifting a heating target.

The electric range according to an embodiment may include a case; a cover plate coupled to an upper end of the case and having an upper surface on which a heating target is disposed; a heating portion disposed inside the case and configured to heat the heating target; and a controller configure to control the heating portion, wherein the controller controls the heating portion to reduce heating power of the heating portion, when the heating target to be heated by the heating portion is lifted from the upper surface of the cover plate.

A control method for an electric range according to another embodiment may include controlling a timer to measure a time value for which a heating target is lifted, when a heating target heated on a cover plate of the electric range; and a controller controlling to reduce heating power of a heating portion of the electric range based on the time value.

A control method for an electric range according to further embodiment may include controlling a height measurer to measure the height of the heating target, when a heating target heated on a cover plate of the electric range; and a controller controlling to reduce heating power of a heating portion of the electric range based on the height value.

Advantageous Effects

The electric range may quickly adjust a heat power.

In addition, the electric range may adjust a heat power by using the user's gesture who holds a cooking container.

In addition, the electric range may allow the user to quickly resolve an emergency without any additional manipulation even in the event of an emergency in the process of heating and cooking.

Specific effects are described along with the above-described effects in the section of Detailed Description.

DETAILED DESCRIPTION OF EXEMPLARY EMBODIMENT

Figure 1:
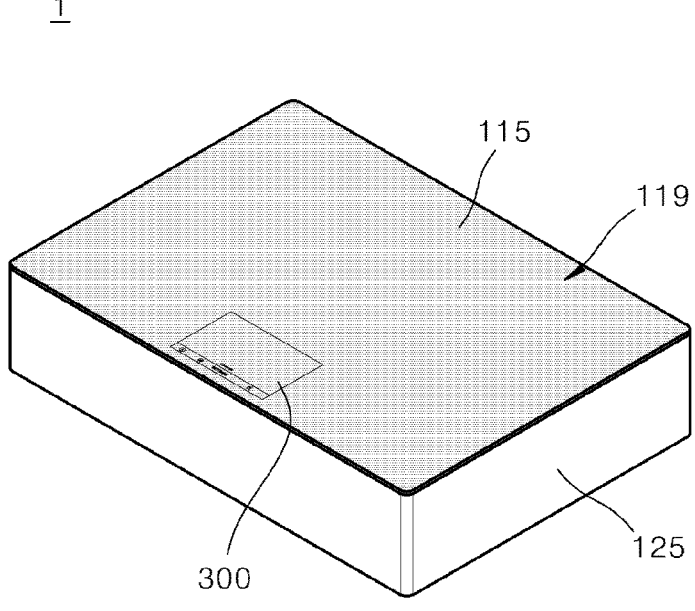
FIG. 1 is a perspective view of a zone-free type induction heating device according to an embodiment of the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Hereinafter, an electric range according to several embodiments of the present disclosure will be described. In the drawings, identical reference numerals can denote identical or similar components.

The electric range described herewith is a concept including both the resistance type electric range and the induction heating type electric range (i.e., an induction heating device). For convenience of description, an embodiment of the present disclosure will be mainly described with respect to a zone-free type induction heating device. However, the present disclosure may not be limited thereto. In particular, the present disclosure may be applicable to other type induction heating devices (e.g., a flex type, a half flex type, a dual type, etc.) other than the electric resistance type electric range and the zone-free type induction heating device.

Figure 2:
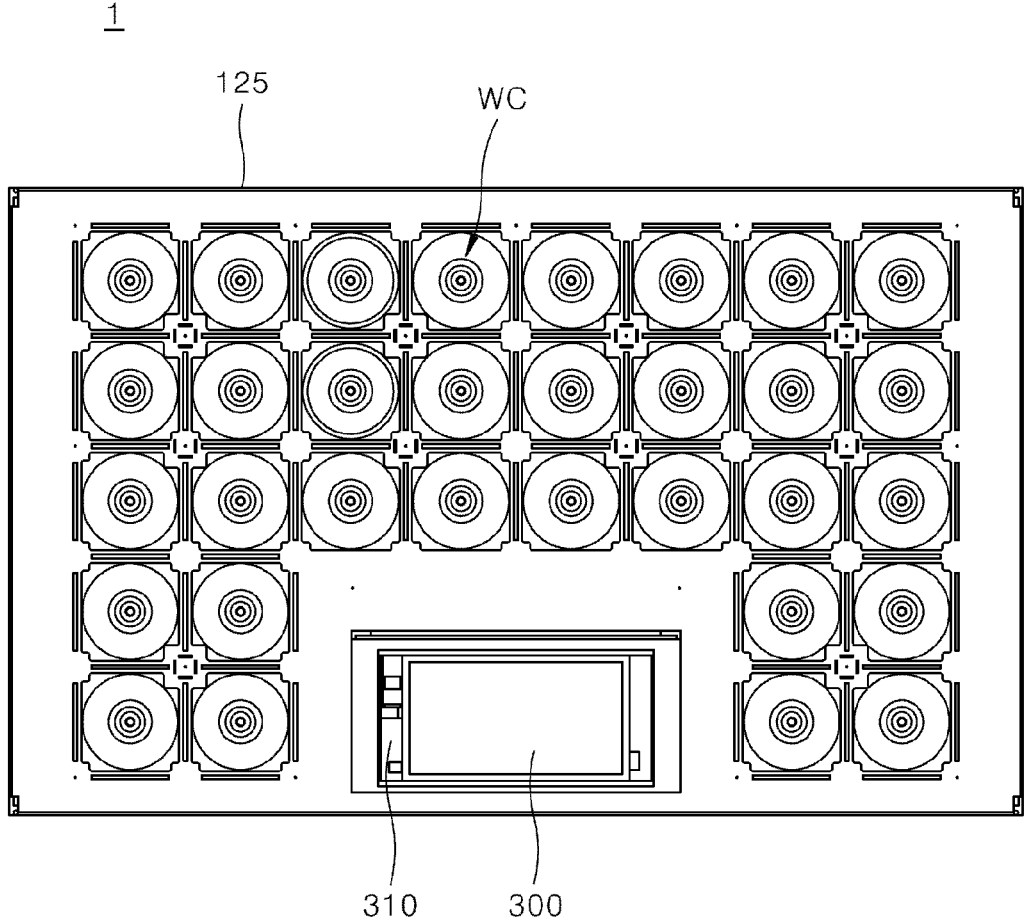
FIG. 2 is a plane view showing a state where some components of FIG. 1 are omitted.
Figure 3:
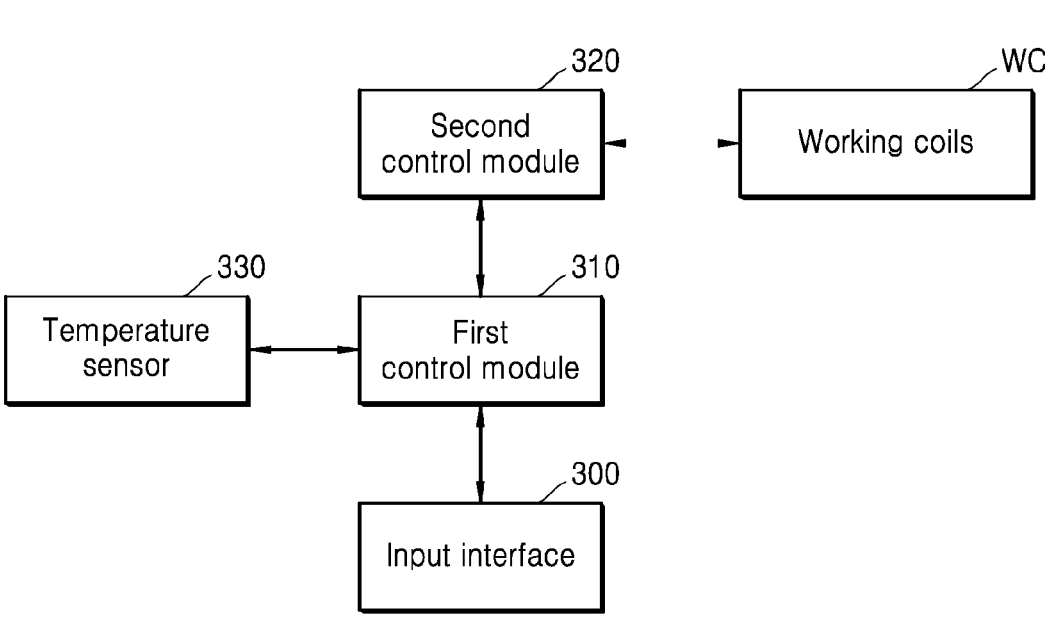
FIG. 3 is a view schematically showing control flow of the zone-free type induction heating device shown in FIG. 1.

FIG. 1 is a perspective view of a zone-free type induction heating device according to an embodiment of the present disclosure. FIG. 2 is a plane view of FIG. 1 with some omitted elements. FIG. 3 is a view schematically showing control flow of the zone-free type induction heating device shown in FIG. 1.

For reference, FIG. 2 is a view in which a cover plate 119 of FIG. 1 is omitted for convenience of description.

Referring to FIGS. 1 to 3, an induction heating device 1 according to an embodiment of the present disclosure may include a case 125, a cover plate 119, an input interface 300, a first control module 310, a second control module 320, a temperature sensor 330 and a plurality of working coils WC.

Although not shown in the drawings, in the case 125 may be disposed various components that constituting the induction heating device 1 including a base plate on which working coils WC are disposed, an indicator substrate support portion on which an indicator substrate is mounted, a plurality of light emitting elements disposed on the indicator substrate, an indicator substrate configured to control driving of the plurality of light emitting elements, a light guide configured to display the light emitted from the light emitting elements through a light emitting surface, and a blower fan configured to cool the heat generated from the plurality of light emitting elements, in addition to the plurality of working coils WC.

Also, in the case may be mounted various devices related to the driving of the working coils WC such as a power supply unit configured to supply AC power, a rectifier configured to rectify the AC power of the power supply unit into DC power, an inverter configured to convert the DC power rectified by the rectifier into a resonance current through a switching operation and provide it to the working coils WC, a second control module 320 configured to control the inverter and components related to driving of the inverter, a relay or semiconductor switch configured to turn on or off the working coils WC, etc., detailed description thereof will be omitted.

The case 125 may be insulated to prevent heat generated by the working coil WC from leaking to the outside.

Meanwhile, the cover plate 119 may be coupled to an upper end of the case 125 to shield the inside of the case 125, and a heating target (not shown, that is, an object heated by at least one of the plurality of working coils WC) may be disposed on an upper surface of the cover plate 119.

Specifically, the cover plate 119 may include an upper plate 115 on which a heating target (e.g., a cooking vessel or container) is placed. The heat generated from the working coil WC may be transmitted to the heating target through the upper plate 115.

In this instance, the upper plate 115 may be made of glass, for example. The input interface 300 configured to receive and transmit a user's input to the first control module 310 may be mounted on the upper plate 115.

The input interface 300 may be installed so as to be flatly embedded in an upper surface of the cover plate 119, that is, installed flat on the same plane as the top plate 115, and may display a specific image. The input interface 300 may be configured to receive the user's touch input and transmit the received touch input to the first control module 310.

Specifically, the input interface 300 may be a module for allowing the user to input a desired heating intensity or time. The input interface 300 may be variously implemented as a physical button or a touch panel. The input interface 300 may also be provided with a display panel configured to display a driving state of the induction heating device 1.

The input interface 300 may transmit the user's input to the first control module 310 and the first control module 310 may transmit the input to the above-described second control module 320 so that detailed description thereof will be made later.

The temperature sensor 330 may be configured to sense the temperature of the cover plate 119.

Specifically, the temperature sensor 330 may sense the temperature of the cover plate 119 and transmit information related to the sensed temperature of the cover plate 119 to the first control module 310.

The first control module 310 may receive the information related to the temperature of the cover plate 119 from the temperature sensor 330 and control whether to display a residual heat image of the input interface 300 based on the information about the temperature of the cover plate 119.

Specifically, the first control module 310 may control driving of the input interface 300. That is, the input interface 300 may display a specific image based on a control command of the first control module 310.

In addition, the first control module 310 may receive the user's touch input from the input interface 300, and transmit the received touch input to the second control module 320 or control or select a specific image displayed on the input interface 300 based on the received touch input.

The first control module 310 may be provided with information about the location of a heating target by the second control module 320, and may control or select a specific image displayed on the input interface 300 based on the received information about the location of the heating target.

Meanwhile, the second control module 320 may be a controller configured to control driving of the plurality of working coils WC. The second control module 320 may sense which one of the working coils WC a heating target is put on.

Specifically, the second control module 320 may control the driving of the plurality of working coils WC by controlling the inverter unit and components related to driving thereof, as described above. In addition, the second control module 320 may provide information about the detected position of the heating target to the first control module 310, and may receive the user's touch input from the first control module 310.

The second control module 320 may control driving of the plurality of working coils WC based on the user's touch input received from the first control module 310.

The plurality of working coils WC may be a heating portion for heating a heating target and provided in the case 125.

Specifically, driving of the plurality of working coils WC may be controlled by the second control module 320. In other words, the plurality of working coils WC may be spaced a preset distance apart from each other as shown in FIG. 2.

For convenience of description, one working coil WC may be described as one example.

Specifically, the working coil WC may be formed in a conductive wire wound in an annular shape a plurality of times, and may generate an alternating magnetic field. A mica sheet and a ferrite core may be sequentially disposed under the working coil WC.

In addition, the ferrite core may be fixed to the mica sheet by a sealant, and may serve to spread an alternating current magnetic field generated from the working coil WC.

The mica sheet may be fixed to the working coil WC and the ferrite core by a sealant, and may prevent heat generated by the working coil WC from being directly transmitted to the ferrite core.

The induction heating device 1 according to an embodiment may also have a wireless power transmission function based on the above-described configuration and characteristics.

Recently, a technology for wirelessly supplying power has been developed and is being applied to many electronic devices. In electronic devices wireless power transmission technology is applied to, the battery is charged simply by placing it on a charging pad without connecting a separate charging connector. An electronic device to which the wireless power transmission is applied may not require a wired cord or charger, so portability may be improved and the size and weight may be reduced compared to the prior art.

The wireless power transmission technology largely includes an electromagnetic induction method using a coil, a resonance method using resonance, and a radio wave radiant method that converts electrical energy into microwaves and transmits them. Among them, the electromagnetic induction method is a technology for transmitting power using electromagnetic induction between a primary coil (e. g., a working coil) provided in a device for transmitting wireless power and a secondary coil provided in a device for receiving wireless power.

Of course, the induction heating method of the induction heating device 1 may have substantially the same principle as the wireless power transmission technology by electromagnetic induction in that the object to be heated is heated by electromagnetic induction.

Accordingly, in the case of the induction heating device 1 according to an embodiment of the present invention, as well as an induction heating function, a wireless power transmission function may be mounted. Furthermore, an induction heating mode or a wireless power transmission mode may be controlled by the first control module 310, and it is possible to selectively use the induction heating function or the wireless power transmission function as needed.

As described above, the induction heating device 1 according to an embodiment of the present disclosure may have the above-described configuration and characteristics. Hereinafter, a method for controlling the heating power of the induction heating apparatus 1 will be described.

Figure 4:
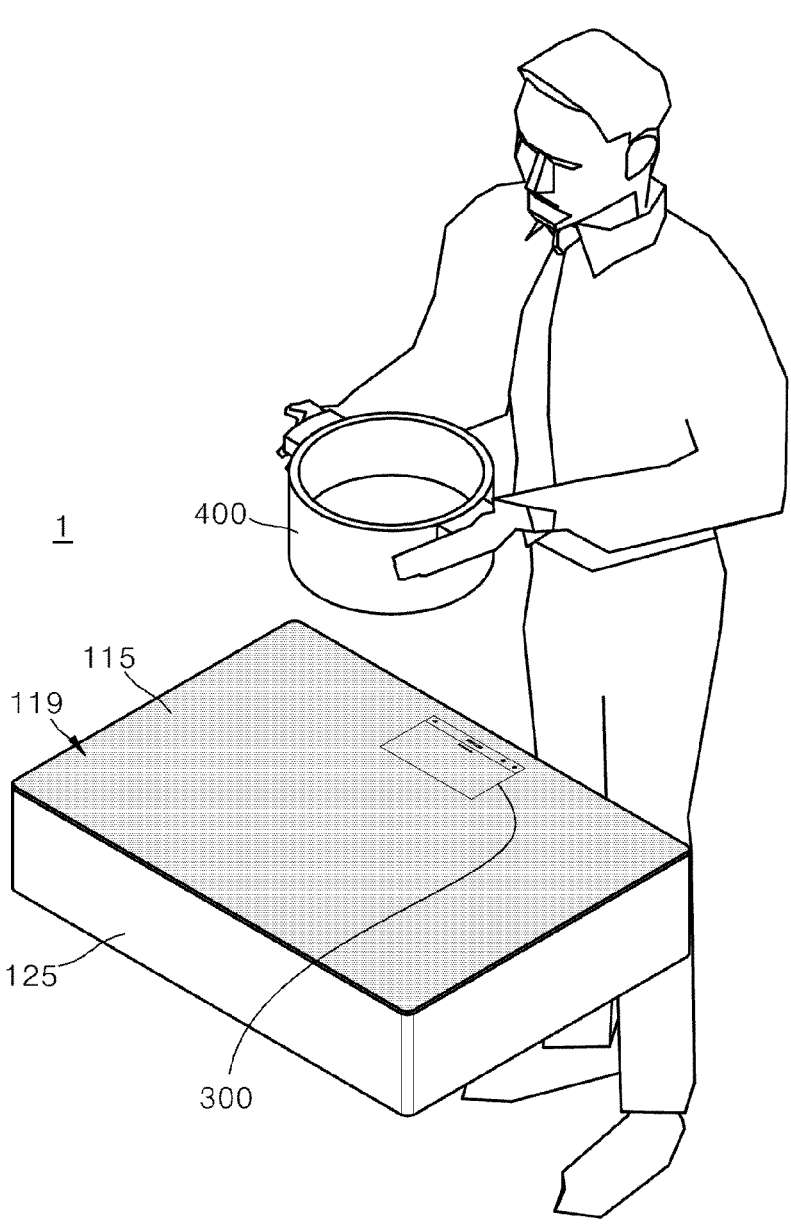
FIG. 4 is a view showing a state in which a user is lifting a heating target from the induction heating device according to an embodiment.
Figure 5:
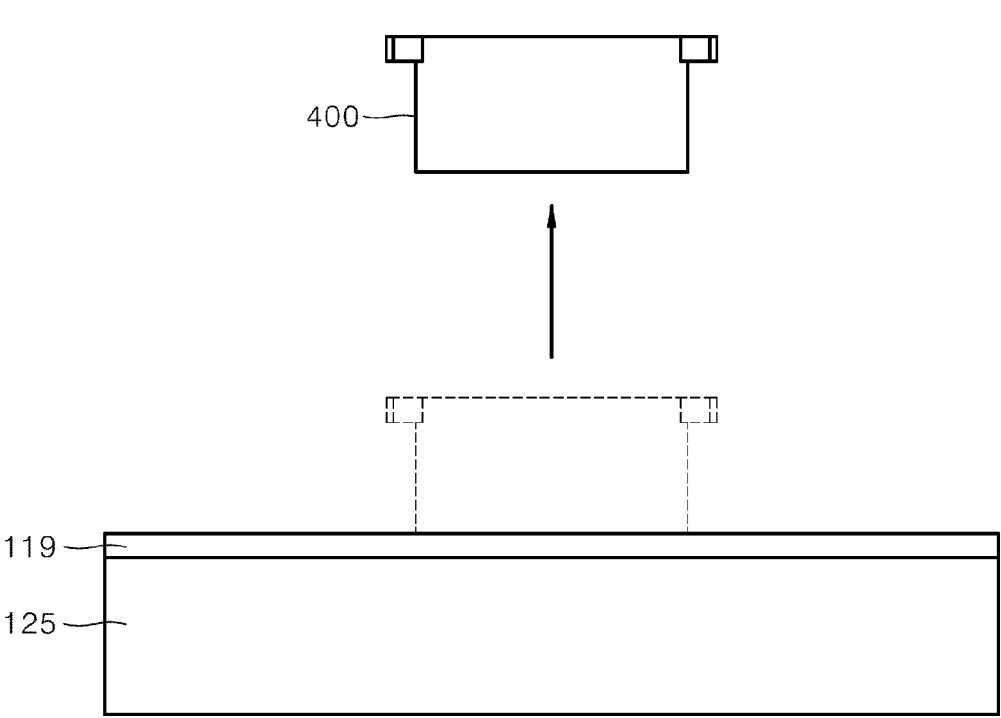
FIG. 5 is a sectional view of FIG. 4.

FIG. 4 is a view showing a state in which a user is lifting a heating target from the induction heating device according to an embodiment. FIG. 5 is a sectional view of FIG. 4.

Figure 6:
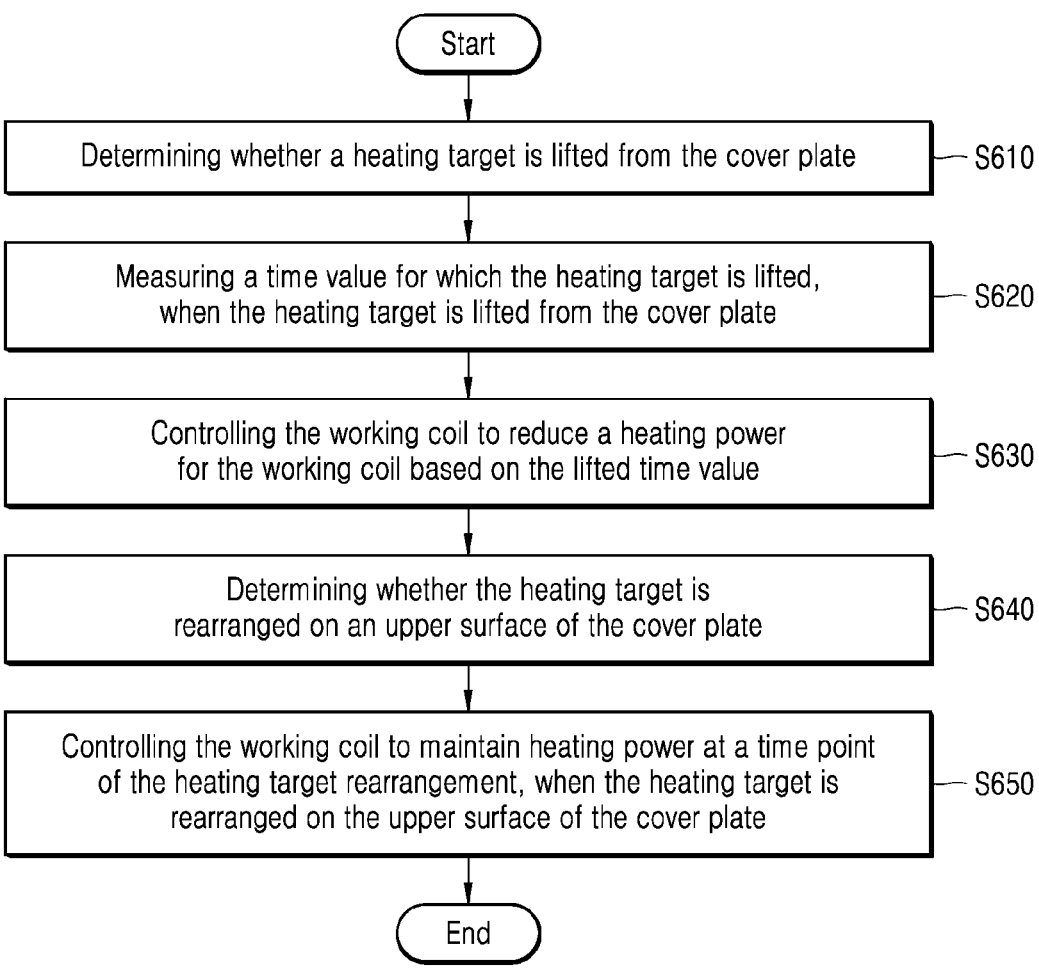
FIG. 6 is a flow chart showing a control method for the induction heating device according to a first embodiment of the present disclosure.

FIG. 6 is a flow chart showing a control method for the induction heating device according to a first embodiment of the present disclosure.

At this time, a heating target 400 (e. g., a pot) may be heated by at least one working coil (WC). After that, the heated target 400 may be lifted upward of the induction heating device 1 by the user.

Meanwhile, the heating object 400 may be heated by at least one working coil WC, but the present embodiment will be described assuming that at least one working coil WC is one working coil WC. However, the present disclosure may not be limited thereto.

Hereinafter, the process performed step by step will be described in detail.

In S610, it is determined whether the heating target 400 heated after put on the upper surface of the cover plate 119 is lifted.

That is, S610 may determine whether the heating target 400 is separated from the cover plate 119.

S610 may be performed by the second control module 320 but the present disclosure may not be limited thereto.

According to an embodiment of the present disclosure, the second control module 320 may determine whether the heating target 400 is lifted from the upper surface of the cover plate 119 by measuring the degree of attenuation of the resonance current flowing through the working coil WC. That is, whether the heating target 400 is lifted may be detected using a non-contact detection signal of the working coil WC.

In S620, when the heating target 400 is lifted from the cover plate 119, a time value for lifting may be measured. That is, S620 may measure the departure or separation time value of the heating target 400 to be separated.

Meanwhile, the induction heating device 1 may include a timer (not shown) and the lifted time value may be measured by the timer. The timer may be implemented as the second control module 320 but the present disclosure is not limited thereto.

In S630, the working coil WC may be controlled to reduce the heating power generated by the working coil WC based on the lifted time value, which may be performed by the second control module 320.

More specifically, the heating target 400 may be heated by the working coil WC. If heating continues for a long time, an emergency situation may occur when the contents (e.g., soup, etc) contained in the heating target boil over. Accordingly, the user could lift the heating target 400 from the cover plate 119 to cool the heating target 400.

At this time, if the user uses both hands to hold the heating target 400, it is impossible to control the heating power of the working coil WC. The user must adjust the heating power of the working coil WC after placing the heating target 400 at a different point. Accordingly, the user might experience inconvenience when adjusting the heating power.

Alternatively, if the user uses one hand to hold the heating target 400 and the other hand to control the heating power of the working coil WC, the heating power may be adjusted but the heating power cannot be quickly adjusted due to the inconvenience of touch operation disadvantageously.

Accordingly, one object of the present disclosure is to quickly and conveniently control the heating power of the induction heating device 1 without user intervention in case of an emergency. To this end, the induction heating device 1 according to the present disclosure may reduce the heating power of the working coil WC based on the lifting time value when the user makes a gesture to lift the heating target 400.

Hereinafter, S630 will be described in detail.

According to an embodiment of the present disclosure, the second control module 320 may control the working coil WC so that the lifting time value of the heating target 400 and a decrease value of the heating power of the working coil WC may be proportional to each other.

That is, as the time value increases, the heating power of the working coil WC may be greatly reduced. As the time value decreases, the heating power of the working coil WC may be slightly reduced.

Specifically, the second control module 320 may control the working coil WC to greatly reduce the heating power by a unit decrease amount for a unit time.

As one example, the unit may be 0.5 seconds, and the unit decrease amount may be "1". When the heating target 400 is lifted for 2 seconds, the heating power generated by the cooking coil WC may be reduced by "4".

Accordingly, the heating power may be quickly reduced without user intervention according to the present disclosure.

Meanwhile, when the heating power is changed, heating power change may be displayed on the input interface 300. That is shown in FIG. 8.

Figure 8:
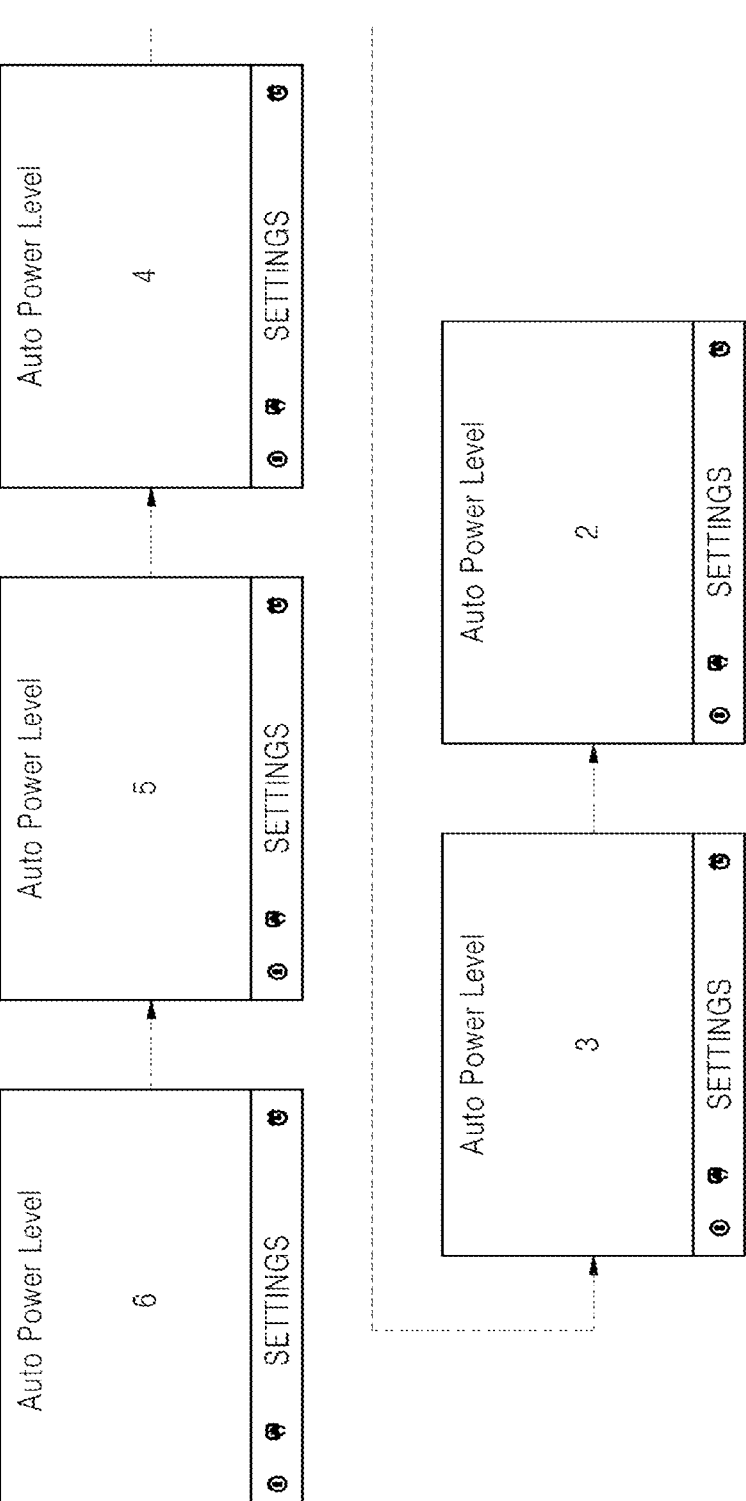
FIG. 8 is a view of an example of information displayed on an input interface when heat power is changed according to an embodiment of the present disclosure.

Referring to FIG. 8, the first heating power at a first time point when the heating target 400 is lifted from the upper surface may "6", the unit time may be set to 0.5 seconds and the unit decrease amount may be set to 1. When the heating target 400 is lifted for 2 seconds, information on the change in the heating power for 2 seconds may be displayed on the input interface 300.

The unit decrease amount may be a variable value. That is, the unit decrease amount may have a different value according to a specific situation.

According to an embodiment of the present disclosure, the unit decrease amount may be set based on the first time point when the heating target 400 is lifted from the upper surface of the cover plate 119.

More specifically, when a first heating power is a high value, the unit decrease amount may be set to a high value. When the first heating power at the first time point is a low value, the unit decrease amount may be set to a low value.

As one example, in case where the maximum value of the heating power is "9", the first heating power is set to "8" and then the unit decrease amount may be set to "2". When the first heating power is set to "4", the unit decrease amount may be set to "1".

Accordingly, when the first heating power at the first time point is a high value, the heating power may be quickly reduced. When the first heating power at the first time point is a low value, the heating power may be precisely reduced.

In other words, when the first heating power at the first time point is high, it means that the user wants to quickly cool the heating target 400 and the second control module 320 may control the working coil WC to quickly reduce the heating power. When the first heating power at the first time point is low, it means that the user wants to precisely adjust the heating power for precise cooking, and the second control module 320 may operate the working coil WC to precisely reduce the heating power at a slow speed.

Generalizing the above, when the firsts heating power is equal to or greater than a first critical heating power, the unit decrease amount may be a first unit decrease amount. When the first heating power is less than the first critical heating power, the unit decrease amount may be a second unit decrease amount, and the first unit decrease amount may be greater than the second unit decrease amount.

In this instance, a first critical heating power may be an intermediate value between a maximum value and a minimum value of the heating power generated from the working coil WC. As one example, when an initial value of the heating power is "9" and the minimum value of the heating power is "1", the first critical heating power may be set to "5".

Meanwhile, according to another embodiment of the present disclosure, when the first heating power is equal to or more than the second critical heating power, the second control module 320 may control the working coil WC to reduce the heating power by a third unit decrease amount in a section between the first heating power and the second critical heating power. Also, the second control module 320 may control the working coil WC to reduce the heating power by a fourth unit decrease amount in a section less than the second critical heating power.

When the first heating power is less than the second critical heating power, the second control module 320 may control the working coil WC to reduce the heating power by a fourth unit decrease amount.

In this instance, the third unit decrease amount may be greater than the fourth unit decrease amount.

The second critical heating power may be an intermediate value between the maximum value and the minimum value of the heating power generated by the working coil WC. Alternatively, the second critical heating power may be an intermediate value between the first heating power and the minimum heating power.

As one example, when the first heating power is set to "8", the second critical heating power is set to "4", the third unit decrease amount is set to "2", the fourth unit decrease amount is set to "1" and the unit time is 0.5 seconds, the second control module 320 may reduce the heating power by "2" per 0.5 seconds in the heating power section between "8" and "4". Accordingly, after one second has elapsed, the first power may be set to "4". After that, the second control module 320 may reduce the heating power by "1" per 0.5 seconds in the heating power section between "4" and "1".

Another embodiment of the present disclosure described above is that the heating target 400 is continuously adjusted in one time section. That is, in the first section in which the first heating power is equal to or greater than the second critical heating power, the second control module 320 may quickly reduce the heating power, and in the second section in which the first heating power is less than the second critical heating power, the second control module 320 may slowly reduce the heating power. Accordingly, the heating target 400 may be quickly cooled in the first section, and precise heating power control may be possible in the second section.

Meanwhile, according to a further embodiment of the present disclosure, when the lifted heating target 400 is not rearranged on the upper surface of the cover plate 119 for more than a critical time, the second control module 320 may control the working coil WC not to generate heating power.

That is, if the lifted heating target 400 is not rearranged on the cover plate 119 within a critical time, the heating target 400 may be highly likely to have been moved to another point. Accordingly, the induction heating device 1 may not generate heating power Referring to FIG. 6 again, a control method for the induction heating device 1 according to a first embodiment will be described.

In S640, it is determined whether the heating target 400 is rearranged on the upper surface of the cover plate 119.

S640 may be performed by the second control module 320 but the present disclosure is not limited thereto.

According to an embodiment, the second control module 320 may determine whether the heating target 400 is rearranged on the upper surface of the cover plate 119 by measuring the degree of attenuation of the resonance current flowing through the working coil WC.

In S650, when the heating target 400 is rearranged on the upper surface of the cover plate 119, the working coil WC may be controlled to maintain the second heating power at the second time point at which the heating target 400 is rearranged.

As one example, when the first heating power at the first time point is set to "8", the second heating power at the second time point is set to "3" after the heating target 400 is lifted for 2 seconds and the heating power is reduced by "5" and the second heating power at the second time point is set to "3", the second control module 320 may maintain the heating power of "3" in time after the second time point.

Accordingly, the user may set the desired heating power through gestures.

Although not shown in the drawings, a guide message of "Heating power is fixed when the heating target 400 is rearranged" may be displayed on the input interface 300.

Figure 7:
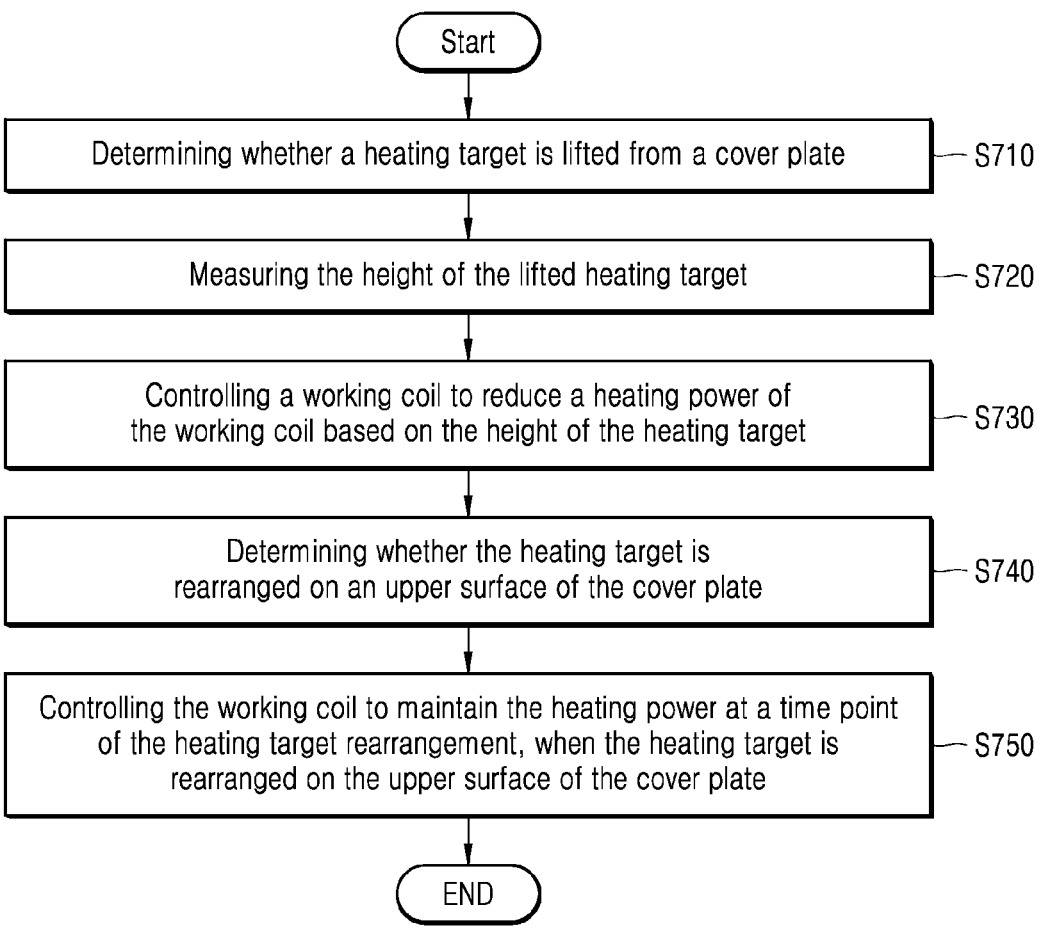
FIG. 7 is a flow chart showing a control method for the induction heating device according to a second embodiment of the present disclosure.

FIG. 7 is a flow chart showing a control method for the induction heating device according to a second embodiment of the present disclosure.

Even at this time, the heating target 400 (e.g., a pot) may be heated by at least one working coil WC. Then, the heated heating target 400 may be lifted upward from the induction heating device 1 by the user.

Hereinafter, a process for each step will be described in detail.

In S710, it may be determined whether the heating target 400 heated after arranged on the upper surface of the cover plate 119 is lifted from the cover plate 119.

At this time, the second control module 320 may determine whether the heating target 400 is lifted from the upper surface of the cover plate 119 by measuring the degree of attenuation of the resonance current flowing through the working coil WC.

S720 may measure the height of the lifted heating target 400.

According to an embodiment, the induction heating device 1 may further include a height measurer (not shown). The height measurer (not shown) may be disposed on the upper surface of the cover plate 119. As one example, the height measurer may be an infrared sensor.

In S730, the working coil WC may be controlled to reduce the heating power based on the height of the heating target 400.

Specifically, an emergency could occur that the contents contained in the heating target 400 boil over. The present disclosure may quickly and conveniently adjust the heating power without the user intervention in case of emergency. The induction heating device 1 according to the present disclosure may reduce the heating power of the working coil WC based on the height of the heating target 400 when the user makes a gesture of lifting the heating target 400.

Hereinafter S730 will be described in detail.

According to an embodiment, the second control module 320 may control the working coil WC so that the height of the heating target 400 and the reduction value of the heating power of the working coil WC may be proportional to each other.

That is, as the height of the heating target 400 increases, the heating power of the working coil WC may be greatly reduced. As the height of the heating target 400 decreases, the heating power of the working coil WC may be slightly reduced.

Specifically, the second control module 320 may control the working coil WC to reduce the heating power by a unit decrease amount per unit height.

As one example, the unit height may be 0.05 m and the unit decrease amount may be "1". When the heating target 400 is lifted by 0.15 m, the heating power of the working coil WC may be reduced by "3".

Accordingly, the heating power may be quickly reduced without the user's intervention.

Meanwhile, when the heating power is changed, the change may be displayed on the input interface 300, which is shown in FIG. 8.

According to another embodiment, when the height of the heating target 400 is greater than or equal to a critical height, the second control module 320 may control the working coil WC not to generate heating power. when the height of the heating target 400 is less than the critical height, the second control module 320 may control the working coil WC so that the height of the heating target 400 and the reduction value of the heating power may be proportional to each other. At this time, the critical height may be directly set based on the user's height.

As one example, it is assumed that the critical height is set to 0.2 m, the unit height is set to 0.05 m and the unit decrease amount is set to "1". At this time, when the heating target 400 is lifted by 0.2 m or more, the second control module 320 may control the working coil WC not to generate heating power. When the heating target is lifted by less than 0.2 m, the working coil WC may be controlled so that the height of the heating target 400 and the decrease value of the heating power may be proportional to each other.

Accordingly, it is possible to prevent an emergency situation when the heating target 400 is lifted above the critical height. It is possible to precisely control the heating power in the second section when the heating target 400 is lifted below the critical height.

According to a further embodiment, when the height of the lifted heating target 400 is not measured, the second control module 320 may control the working coil WC not to generate heating power.

That is, when the height of the lifted heating target 400 is not measured, the heating target 400 may be highly likely to have been moved to another point. Accordingly, the induction heating device 1 may not generate heating power.

Meanwhile, according to a further embodiment, if the height of the heating target 400 lifted for a preset time is not changed, the second control module 320 may control the working coil WC to maintain the heating power corresponding to the unchanged height.

As one example, the unit height is set to 0.05 m, the unit decrease amount is set to "1", the first heating power at the first time point when the heating target 400 is lifted is set to "6", the lifted heating target 400 is continuously located at the height of 0.1 m for 2 seconds. In this instance, the second control module 320 may control the working coil WC to maintain the heating power of "4".

Accordingly, the user may set a desired heating power through a gesture.

In S740, it may be determined whether the heating target 400 is rearranged on the upper surface of the cover plate 119.

S740 may be performed by the second control module 320 but the present disclosure is not limited thereto.

According to an embodiment, the second control module 320 may determine whether the heating target 400 is rearranged on the upper surface of the cover plate 119 by measuring the degree of attenuation of the resonance current flowing through the working coil WC.

In S750, the working coil WC may be controlled to maintain a second heating power at a second time point when the heating target 400 is rearranged, when the heating target 400 is rearranged on the upper surface of the cover plate 119.

In short, when the heating target 400 heated by the working coil WC is lifted from the upper surface of the cover plate 119, the working coil WC may be controlled to reduce the heating power. At this time, a time value for which heating target 400 is lifted or a height value of the lifted heating target 400 may be used as a reference for controlling the heating power.

Accordingly, the induction heating device 1 according to the present disclosure may quickly adjust the heating power, and may adjust the heating power by using a gesture of the user holding the cooking vessel or container. In addition, even when an emergency situation occurs in the process of heating and cooking using the induction heating device 1, the user can quickly solve the emergency situation without a separate manipulation action.

Embodiments of the present disclosure may be implemented in the form of program instructions that can be executed through various computer means and recorded in a computer-readable medium. The computer-readable medium may include program instructions, data files, data structures and the like, alone or in combinations.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

What is claimed is:

1. An electric range, comprising:
a case;
a cover plate coupled to an upper end of the case and having an upper surface on which a heating target is disposed;
a heating portion disposed inside the case and configured to heat the heating target; and a controller configured to control the heating portion, wherein the controller controls the heating portion to reduce a heating power of the heating portion, when the heating target to be heated by the heating portion is lifted from the upper surface of the cover plate, wherein the controller controls the heating portion to reduce the heating power generated by the heating portion based on a time value for which the heating target is lifted, wherein the controller controls the heating portion to reduce the heating power by a unit decrease amount for a unit time, wherein the unit decrease amount is set based on a first heating power at a first time point at which the heating target is lifted from the upper surface of the cover plate, wherein when the first heating power is greater than or equal to a first critical heating power, the unit decrease amount is a first unit decrease amount, when the first heating power is less than the first critical heating power, the unit decrease amount is a second unit decrease amount, and wherein the first unit decrease amount is greater than the second unit decrease amount.

2. The electric range of claim 1, wherein when the first heating power is greater than or equal to a second critical heating power, the controller controls the heating portion to reduce the heating power by a third unit decrease amount in a section between the first heating power and the second critical heating power, and controls the heating portion to reduce the heating power by a fourth unit decrease amount in a section less than the second critical heating power, and wherein the third unit decrease amount is greater than the fourth unit decrease amount.

3. The electric range of claim 2, wherein when the first heating power is less than the second critical heating power, the controller controls the heating portion to reduce the heating power by the fourth unit decrease amount.

4. The electric range of claim 1, wherein when the lifted heating target is not rearranged on the upper surface of the cover plate for more than a critical time, the control unit controls the heating portion not to generate the heating power.

5. The electric range of claim 1, wherein the heating portion is a working coil, and wherein the controller determines whether the heating target is lifted from the upper surface of the cover plate by measuring a degree of attenuation of a resonance current flowing through the working coil.

6. The electric range of claim 1, wherein when the lifted heating target is rearranged on the upper surface of the cover plate, the controller controls the heating portion to maintain a second heating power at a second time point at which the heating target is rearranged.

7. The electric range of claim 1, wherein when the lifted heating target is rearranged on the upper surface of the cover plate, the controller controls the heating portion to maintain a second heating power at a second time point at which the heating target is rearranged.

8. An electric range, comprising:
a case;
a cover plate coupled to an upper end of the case and having an upper surface on which a heating target is disposed;
a heating portion disposed inside the case and configured to heat the heating target; and
a controller configured to control the heating portion, wherein the controller controls the heating portion to reduce a heating power of the heating portion, when the heating target to be heated by the heating portion is lifted from the upper surface of the cover plate, wherein the controller controls the heating portion to reduce the heating power of the heating portion based on a height of the lifted heating target, and wherein the controller controls the heating portion for the height of the lifted heating target and a decrease value of the heating power to be proportional to each other.

9. The electric range of claim 8, wherein the controller controls the heating portion to reduce the heating power by a unit decrease amount per a unit height.

10. The electric range of claim 8, wherein when the height of the lifted heating target is greater than or equal to a critical height, the controller controls the heating portion not to generate the heating power, and wherein when the height of the lifted heating target is less than the critical height, the controller controls the heating portion for the height of the lifted heating target and the decrease value of the heating power to be proportional to each other.

11. The electric range of claim 8, wherein when the height of the lifted heating target is not measured, the controller controls the heating portion not to generate the heating power.

12. The electric range of claim 8, wherein when the height of the lifted heating target is not changed for a preset time, the controller controls the heating portion to maintain the heating power corresponding to the height not changed.

13. The electric range of claim 8, wherein when the lifted heating target is rearranged on the upper surface of the cover plate, the controller controls the heating portion to maintain a second heating power at a second time point at which the heating target is rearranged.

14. The electric range of claim 8, wherein when the lifted heating target is not rearranged on the upper surface of the cover plate for more than a critical time, the control unit controls the heating portion not to generate the heating power.

15. The electric range of claim 8, wherein the heating portion is a working coil, and wherein the controller determines whether the heating target is lifted from an upper surface of the cover plate by measuring a degree of attenuation of a resonance current flowing through the working coil.

16. An electric range, comprising:
   a case;
   a cover plate coupled to an upper end of the case and having an upper surface on which a heating target is disposed;

a heating portion disposed inside the case and configured to heat the heating target; and a controller configured to control the heating portion, wherein the controller controls the heating portion to reduce a heating power of the heating portion, when the heating target to be heated by the heating portion is lifted from the upper surface of the cover plate, wherein the controller controls the heating portion to reduce the heating power generated by the heating portion based on a time value for which the heating target is lifted, wherein the controller controls the heating portion for the time value for which the heating target is lifted and a decrease amount of the heating power to be proportional to each other, wherein when a first heating power is greater than or equal to a first critical heating power, the controller controls the heating portion to reduce the heating power by a first unit decrease amount in a section between the first heating power and the first critical heating power, and controls the heating portion to reduce the heating power by a second unit decrease amount in a section less than the first critical heating power, and wherein the first unit decrease amount is greater than the second unit decrease amount.

17. The electric range of claim 16, wherein when the first heating power is less than the first critical heating power, the controller controls the heating portion to reduce the heating power by the second unit decrease amount.

18. The electric range of claim 16, wherein when the lifted heating target is not rearranged on the upper surface of the cover plate for more than a critical time, the control unit controls the heating portion not to generate the heating power.

19. The electric range of claim 16, wherein the heating portion is a working coil, and wherein the controller determines whether the heating target is lifted from the upper surface of the cover plate by measuring a degree of attenuation of a resonance current flowing through the working coil.

20. The electric range of claim 16, wherein when the lifted heating target is rearranged on the upper surface of the cover plate, the controller controls the heating portion to maintain a second heating power at a time point at which the heating target is rearranged.

* * * * *